A. SMITH.
Preservatory.
No. 52,650. Patented Feb. 13, 1866.
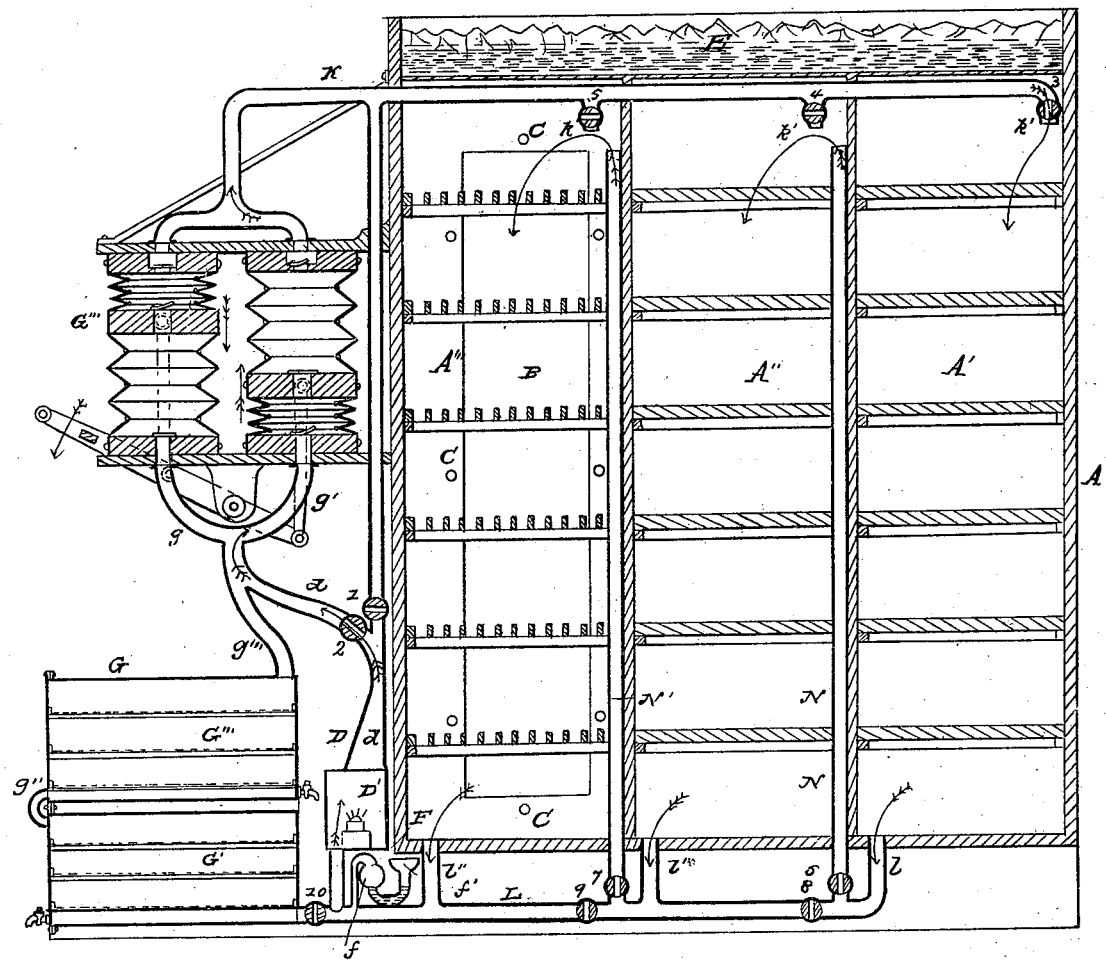
WITNESSES
INVENTOR

UNITED STATES PATENT OFFICE.

ADDISON SMITH, OF PERRYSBURG, ASSIGNOR TO HIMSELF, DAVID M. MEFFORD, AND GILES BOALT, OF NORWALK, OHIO.

IMPROVED PRESERVATORY.

Specification forming part of Letters Patent No. 52,650, dated February 13, 1866.

*To all whom it may concern:*

Be it known that I, ADDISON SMITH, of Perrysburg, Wood county, Ohio, have invented a new and useful Preservatory for the Preservation of Fruits and other Perishable Substances; and I hereby declare the following to be a full, clear, and exact description thereof, reference being had to the accompanying drawings, making part of this specification.

My invention consists in an apparatus for the preservation in a fresh state of fruits, vegetables, and other edible and perishable substances by abstracting the oxygen from the air surrounding them, leaving the nitrogen and other inert gases to balance the pressure of the outer air. Moisture being also a destructive agent, provision is made for absorbing it. A low temperature is also requsite for some fruits, in which case ice is employed.

In the accompanying diagram the various parts are brought arbitrarily into one plane for convenience of illustration.

I provide a case or chamber, A, so formed as to exclude external air, heat, and so forth, and which may be divided into a series of compartments, A' A'' A''', closed by suitable doors B, which may be listed with india-rubber and fastened by screws C or equivalent devices.

The fruit or other edible is deposited in the compartments either in bulk or, in the case of small perishable fruit, in open trays, separated so as to admit a free passage of air across the upper and under surfaces of each.

The operation of abstracting oxygen is twofold: first, in what I call the "combustion" or "lamp" circuit, D, by traversing a lamp or furnace D', charged with an active combustible, such as alcohol or charcoal, that will impart neither taste nor ordor to the articles; and, secondly, by means of chemical reagents in what I call the "deoxygenating" and "desiccating" circuit, G.

The first operation, by combustion, is used at the commencement of the process and continued until the remaining oxygen will no longer support combustion. The current of air is then cut off from the lamp-circuit and passed through a chamber, G', containing some one or more of the well-known deoxygenating agents, such as hydrated protoxide of iron in an alkaline solution, protosulphate of iron saturated with nitric oxide, solution of proto sulphate of iron, &c. Through this circuit the circulation is continued until all of the free oxygen is removed.

During the entire period in which the fruit is stored the air in the cases is from time to time passed through the deoxygenating-circuit G to remove any oxygen that may find its way into the chamber by leakage or by emission from the fruit or other contents themselves, and as there is also a constant escape of moisture from the contents, a desiccating-chamber, G'', is placed in the circuit charged with some suitable hygrometric absorbent, such as sulphuric acid or chloride of calcium.

The circulation of the air through the deoxygenating-circuit G is maintained by means of a double-acting bellows, G''', or pump, or other mechanical appliance.

The top of the chamber A may consist of thin sheet-metal, forming the bottom of a pan or tank, E, for holding ice.

D' represents a lamp or furnace. From the lamp or furnace D' a pipe or duct, $d$, ascends and divides into two branches, of which one, $d'$, bifurcates $g$ $g'$ into the double bellows, G''', while the main pipe or duct $d$ continues upward and enters a pipe or duct, K, conducting from the bellows into the compartments A' A'' A''', which it enters by branches $k'$ $k''$ $k'''$, which pass each one into the upper part of its appropriate compartment.

From the bottom of each compartment branch pipes $l$ $l'$ $l''$ conduct into a return-pipe, L, which communicates with the bottom of the combustion-circuit D and with the deoxygenating-circuit G, which includes the deoxygenating-chamber G' and the desiccating-chamber G'', which communicates with said chamber G' through a pipe or duct, $g''$, and which communicates, by means of a pipe or duct, $g'''$, with the bellows G'''. The return-pipe L communicates with the upper part of each compartment except the last by means of branches N and N'.

1, 2, 3, 4, 5, 6, 7, 8, 9, and 10 are valves or cocks in the various pipes or ducts.

The branch circuit for completing the absorption of oxygen by chemical reagents (which, as before stated, I have denominated the "deoxygenating-circuit" to distinguish it from the lamp-circuit) connects with the lamp-circuit immediately under the lamp, where is placed the cock 10, which opens or closes the connection.

For the preservation of fruits, &c., on a commercial scale, the chambers, cases, or receptacles would be placed in a suitable frost-proof building in double rows, joined back to back, each front opening into avenues extending across the building, and sufficiently spacious to afford easy access to the cases.

The operation of the apparatus will now be seen. The case or cases being charged with fruit or other edibles and the lamp or furnace started, the cocks 2, 4, 5, 8, 9, and 10 are closed and the cocks 1, 3, 6, and 7 are opened. The superior levity of the heated air in the pipe $d$ causes it to ascend and give place to the cooler and heavier air from below, thus creating a circulation through all the compartments in the manner indicated by the arrows, the arrangement being such as to cause the deoxygenated air from the lamp to pass first into the compartment A', most distant from the lamp, and thence, having passed into the return-pipe L, to ascend therefrom by the vertical branch N into the compartment next adjoining, and so on for the entire series, escaping from the last compartment, A''', in the return movement and returning to the lamp D' through the pipe L. The circulation is thus maintained by the alternate heating and cooling of the air until the supply of oxygen begins to fail, when the valve 1 is closed and the valve 2 is opened. The draft is then kept up by the action of the bellows to the end of combustion. When the combustion ceases the valves 1 and 2 are closed and the valve 10 opened, the other valves remaining as before. The bellows are then a second time set in motion so as to draw air upward from the return-pipe through the deoxygenating and desiccating chambers and force it into the compartments, where it is compelled to follow the meandering course already described. The comparatively warm air from the deoxygenating-circuit, on entering a compartment, spreads horizontally over the entire upper portion thereof, so as to form, as it were, an aerial mantle or diaphragm, which, permeating every interstice, gradually takes the place of the oxygenated air, which, flowing out of the compartment into the return-pipe, becomes, in turn, subjected to the deoxygenating action. By this means an active circulation and deoxygenation are made to take place in every part of the compartment.

The above arrangement manifestly permits of a circulation through the whole or any less number of the compartments down to a single one.

F represents an apparatus for admitting portions of outer air to supply the vacancy caused by absorption of oxygen and water. It consists of an inverted siphon, the inner branch expanding into a bulb, $f$, of capacity at least equal to that of the siphon. The bulb contracts again to a tube, which is curved downward and the end inserted into the return-pipe L near the lamp. The outer end of the siphon terminates in a funnel-shaped opening, $f'$, to charge the siphon and prevent its overflow.

With such an arrangement it is obvious that when the volume of air in the cases is diminished by the absorption of oxygen, so that the external pressure will exceed the weight of the column of fluid in the siphon, the air will ascend through the fluid in the bulb, and so continue to enter the chamber until equilibrium is restored.

Alcohol, charcoal, sulphur, or other suitable combustible may be employed for the primary deoxygenation, according to the nature of the article to be preserved, and other circumstances.

For completing the deoxygenation I may employ an alkaline solution of hydrated protoxide of iron, or a solution of iron saturated with binoxide of nitrogen, or pale green crystals of protosulphate of iron deposited from neutral solutions, &c.

For abstracting moisture I may employ sulphuric acid, or chloride of calcium, or other suitable absorbent.

The phrase "opposite ends" in the subsequent claims is intended to mean that the inlet and exit apertures of the deoxygenating chamber or circuit should be situated at parts of said chamber as remote as they can be conveniently arranged in each particular case.

The phrase "forced circulation" in the subsequent claims is intended to refer to either a circulation by the disturbing force of combustion or by a bellows or other mechanical appliance, or by both in conjunction.

I claim herein as new and of my invention—

1. A receptacle, compartment, or box for fruit or other edibles, having two orifices or series of orifices communicating, respectively, with opposite ends of a deoxygenating chamber or circuit outside of said receptacle, and provided with a forced circulation, substantially as and for the purpose set forth.

2. In the described communication with one another, the following elements, to wit: the closed preserving-chamber A, whether subdivided or otherwise, and the closed combustion chamber or circuit D.

3. In the described communication with one another, the following elements, to wit: the closed preserving-chamber A, the combustion-circuit D, and the mechanical circulation G'''.

4. In the described communication with one another, the following elements, to wit: the closed preserving-chamber A and the deoxygenating-chamber G'.

5. In the described communication with one another, the following elements, to wit: the closed preserving-chamber A and the desiccating-chamber G''.

6. The closed preserving-chamber A, communicating with the described deoxygenating and desiccating circuit G, provided with a forced circulation, the whole being combined and operating substantially as and for the purpose set forth.

7. A closed preserving-chamber having the meandering ventilating-ducts L $l$ $l'$ $l''$, in which a circulation and deoxygenation is maintained by alternative connection with the combustion-circuit D and with the deoxygenating-circuit G, substantially as herein set forth and described.

8. A closed preserving-chamber in which a circulation, deoxygenation, and desiccation of the air is maintained by the use of a desiccating-chamber, G'', in combination with a deoxygenating-chamber, G' or D', and a forcing apparatus, G'''.

9. The series of closed preserving-chambers provided with the meandering-ducts L $l$ $l'$, having a forced circulation, and communicating with a closed deoxygenating-chamber, G', and a closed desiccating-chamber, G'', substantially as set forth.

In testimony of which invention I hereunto set my hand.

ADDISON SMITH.

Witnesses:
EMMA F. SMITH,
GEO. H. KNIGHT.